(12) United States Patent
Peterson

(10) Patent No.: US 6,698,892 B2
(45) Date of Patent: Mar. 2, 2004

(54) ACHIEVING COLOR BALANCE IN IMAGE PROJECTION SYSTEMS BY INJECTING COMPENSATING LIGHT IN A CONTROLLED AMOUNT

(75) Inventor: Mark Peterson, Lake Oswego, OR (US)

(73) Assignee: Infocus Corporation, Wilsonville, OR (US)

( * ) Notice: Subject to any disclaimer, the term of this patent is extended or adjusted under 35 U.S.C. 154(b) by 0 days.

(21) Appl. No.: 09/978,133

(22) Filed: Oct. 15, 2001

(65) Prior Publication Data

US 2002/0186350 A1 Dec. 12, 2002

Related U.S. Application Data

(63) Continuation-in-part of application No. 09/877,955, filed on Jun. 8, 2001.

(51) Int. Cl.[7] ................ G03B 21/26; G03B 21/14; G03B 21/00; G02B 27/00
(52) U.S. Cl. ............ 353/29; 353/20; 353/31; 353/69; 353/84; 353/94; 353/122; 359/577
(58) Field of Search ................ 362/230, 231, 362/233, 236, 237, 239, 250, 251, 252; 353/94, 31, 84, 20, 29, 69, 122; 359/577

(56) References Cited

U.S. PATENT DOCUMENTS

| | | | |
|---|---|---|---|
| 5,233,385 A | 8/1993 | Sampsell | |
| 5,706,061 A | 1/1998 | Marshall et al. | 348/743 |
| 6,129,444 A | * 10/2000 | Tognoni | 362/295 |
| 6,398,389 B1 | * 6/2002 | Bohler et al. | 362/293 |
| 2002/0149750 A1 | * 10/2002 | Kane | 353/94 |
| 2002/0154277 A1 | * 10/2002 | Mukawa et al. | 353/31 |

* cited by examiner

*Primary Examiner*—Russell Adams
*Assistant Examiner*—Melissa J. Koval
(74) *Attorney, Agent, or Firm*—Schwabe, Williamson & Wyatt, PC

(57) ABSTRACT

The image projection system of the present invention improves either one or both of the brightness and color balance of a projected image. The system includes an auxiliary light source from which compensating light co-propagates with polychromatic light emitted by a primary light source along a primary light path. The compensating light has an emission energy content that minimizes an emission energy imbalance introduced by the primary light source and an intensity that is, in part, established by the application of electrical energy to the auxiliary light source. Adjusting the amount of electrical energy applied to the auxiliary light source regulates the color temperature of the projected image without perceptibly decreasing its brightness.

20 Claims, 9 Drawing Sheets

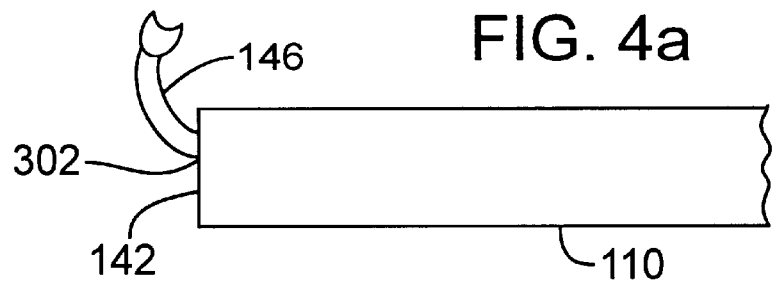
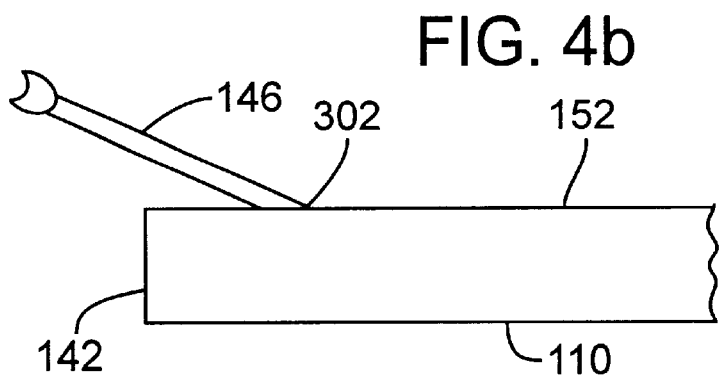
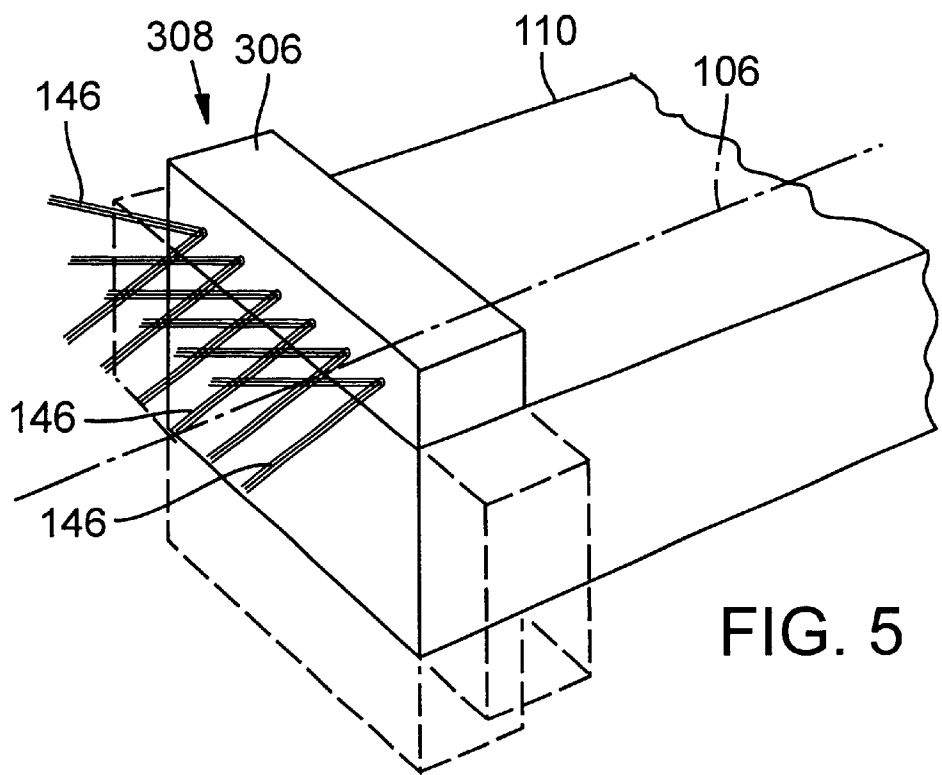

ACHIEVING COLOR BALANCE IN IMAGE PROJECTION SYSTEMS BY INJECTING COMPENSATING LIGHT IN A CONTROLLED AMOUNT

RELATED APPLICATION

This is a continuation in part of application Ser. No. 09/877,955, filed Jun. 8, 2001.

TECHNICAL FIELD

This invention relates to image projection systems and more particularly to a method for improving the brightness and color balance of images produced by such projection systems.

BACKGROUND OF THE INVENTION

Image projection systems have been used for many years to project motion pictures and still photographs onto screens for viewing. More recently, presentations using multimedia projection systems have become popular for conducting sales demonstrations, business meetings, and classroom instruction.

Color image projection systems operate on the principle that color images are produced from the three primary light colors: red ("R"), green ("G"), and blue ("B"). With reference to FIG. 1, a prior art image projection system 100 includes a primary light source 102 positioned at the focus of an ellipsoidal light reflector 104 to produce light rays 105 (not shown) of polychromatic light that propagate along a primary light path 106 through a rotating color wheel assembly 108. Color wheel assembly 108 includes at least three filter sections, each tinted in a different one of primary colors R, G, and B. Light rays 105 of polychromatic light emitted by primary light source 102 propagate along light path 106 through an optical integrating device, preferably a light tunnel 110 of either a solid or hollow type, to create at its exit end a uniform illumination pattern. (A light tunnel 110 of a solid type is shown in FIG. 1.) Light tunnel 110 works on the principle of multiple reflection to achieve uniform light intensity over a rectangular area with the same dimensional proportions as the final projected image. The illumination pattern is imaged by a lens element system 112, reflected off a light reflecting surface 114, and transmitted through a projection lens 116 to form an image. Popular commercially available image projection systems of a type described above include the LP300 series manufactured by InFocus Corporation, of Wilsonville, Oreg., the assignee of this application.

There has been significant effort devoted to developing image projection systems that produce bright, high-quality color images. However, the optical performance of conventional projectors is often less than satisfactory. For example, suitable projected image brightness is difficult to achieve, especially when using compact portable color projectors in a well-lighted room.

To improve the brightness of images they project, image projection systems typically employ a high-intensity discharge ("HID") arc lamp as primary light source 102. FIG. 2 shows an exemplary HID arc lamp 120 that includes first and second electrodes 122 and 124 separated by an arc gap 126, which is preferably between 0.8 and 2.0 mm wide. First and second electrodes 122 and 124 and arc gap 126 are contained within a sealed pressurized chamber 128 that is filled with ionizable gases and solids. A high voltage pulse applied to first electrode 122 by an external voltage source (not shown) causes ionization of the gases and solids contained within chamber 128 such that a steady state reversible reaction occurs, resulting in the formation of plasma. The current flow developed across arc gap 126 is maintained by external lamp driving electronic circuitry, thereby maintaining the plasma generated by the steady state reversible reaction. The plasma emits bright polychromatic light. The components of arc lamp 120 are enshrouded in a glass envelope 130, and conductive foil plates 132 are attached to electrodes 122 and 124 to dissipate heat and thereby prevent cracking of glass envelope 130.

Thus HID arc lamps produce a point source of intense polychromatic light. Placing the HID arc lamp adjacent to an ellipsoidal reflector allows focusing of the intense polychromatic light with high precision onto a color wheel. HID arc lamps have many favorable attributes, such as high intensity, efficiency, and reliability; but, unfortunately, the polychromatic light emitted by HID arc lamps is not balanced in terms of its emission energy content. Specifically, HID arc lamps provide greater emission energy content at the blue end of the color spectrum than at the red end, causing an emission energy imbalance. There have been several attempted approaches to solving this problem.

One attempt to minimize illumination emission energy imbalance entailed increasing the angular extent (physical size) of the color wheel R filter segment relative to the angular extent of the B filter segment and/or increasing the attenuation of the color wheel B filter segment relative to the attenuation of the R filter segment. A second attempt entailed reducing overall brightness levels through color lookup electronics to achieve "headroom" for color adjustments. Unfortunately, these attempts either caused temporal artifacts or decreased image brightness. A third attempt entailed adding a white filter segment to the color wheel to provide a "white peaking" function. The addition of a white filter segment increased image brightness but resulted in a loss of brightness of saturated colors. Unfortunately, these optical components caused a significant amount of light to escape from the primary colors. A fourth attempt entailed simply employing a more powerful arc lamp in the projection system. When implemented in compact portable projectors, this method led to heat, size, weight, cost, and reliability issues.

What is needed, therefore, is an image projection system that is implemented with an improved technique for achieving increased image brightness and adjustable color balance while minimizing light loss.

SUMMARY OF THE INVENTION

One object of the present invention is, therefore, to provide an apparatus and a method for improving the brightness and color balance of an image projected by and for minimizing the light loss from an image projection system.

Another object of the present invention is to adjust the color temperature of the projected image to a desirable setting without introducing perceptible image artifacts, losing bit depth, or perceptibly reducing image brightness.

The present invention achieves improved image brightness and color balance of an image projection system illuminated by a primary source of polychromatic light. The invention entails adding to the image projection system an auxiliary light source from which compensating light co-propagates with the polychromatic light along a primary light path. The compensating light has an emission energy content that minimizes an emission energy imbalance introduced by the primary light source. For example, in the above-mentioned instance of insufficient emission energy content at the red end of the color spectrum, the auxiliary light source provides compensating light whose emission energy content corresponds to red light and thereby minimizes the emission energy imbalance.

In a first preferred embodiment, the auxiliary light source is affixed at a location near the entrance end of the optical integrating device of the image projection system such that the compensating light coincides with the primary light path at a location upstream of the place where the first paraxial reflection occurs. Affixing the auxiliary light source at a location near the entrance end of the optical integrating device causes minimal light loss because a minimal amount of polychromatic light is incident near the entrance end of the optical integrating device. For this reason, the auxiliary light source of the first preferred embodiment improves the brightness and/or color balance of the projected image while minimizing the amount of light loss within the image projection system.

In a second preferred embodiment, the auxiliary light source is coupled to the light reflector adjacent to the primary light source, thereby allowing the compensating light emitted from the auxiliary light source to be directed through the image projection system with the same efficiency as that of the polychromatic light generated by the primary light source. The light reflector is preferably coated with a color selective transmission coating that transmits the emission energy of the light emitted by the auxiliary light source and reflects all other emission energies. This coating minimizes the loss of light from the primary light source through the area in which the auxiliary light source is affixed.

In a third preferred embodiment, the amount of electrical energy flowing into the auxiliary light source, which can be coupled to the image projection system consistent with the teachings of either of the first or second preferred embodiments, can be adjusted such that a desired color temperature may be achieved without introducing perceptible image artifacts, losing bit depth, or reducing perceptible image brightness.

Additional objects and advantages of this invention will be apparent from the following detailed description of preferred embodiments thereof, which proceeds with reference to the accompanying drawings.

BRIEF DESCRIPTION OF THE DRAWINGS

FIGS. 4a and 4b are fragmentary side elevation views of different implementations of the first embodiment of the illumination subsystem implemented with alternative optical fibers.

FIG. 5 is a fragmentary isometric view of the first embodiment of the illumination subsystem of FIG. 3a implemented with a fiber optic bundle attached to an optical integrating device.

FIG. 13b is an enlarged view of the illumination subsystem of FIG. 13a.

DETAILED DESCRIPTION OF PREFERRED EMBODIMENTS

Figure 1:
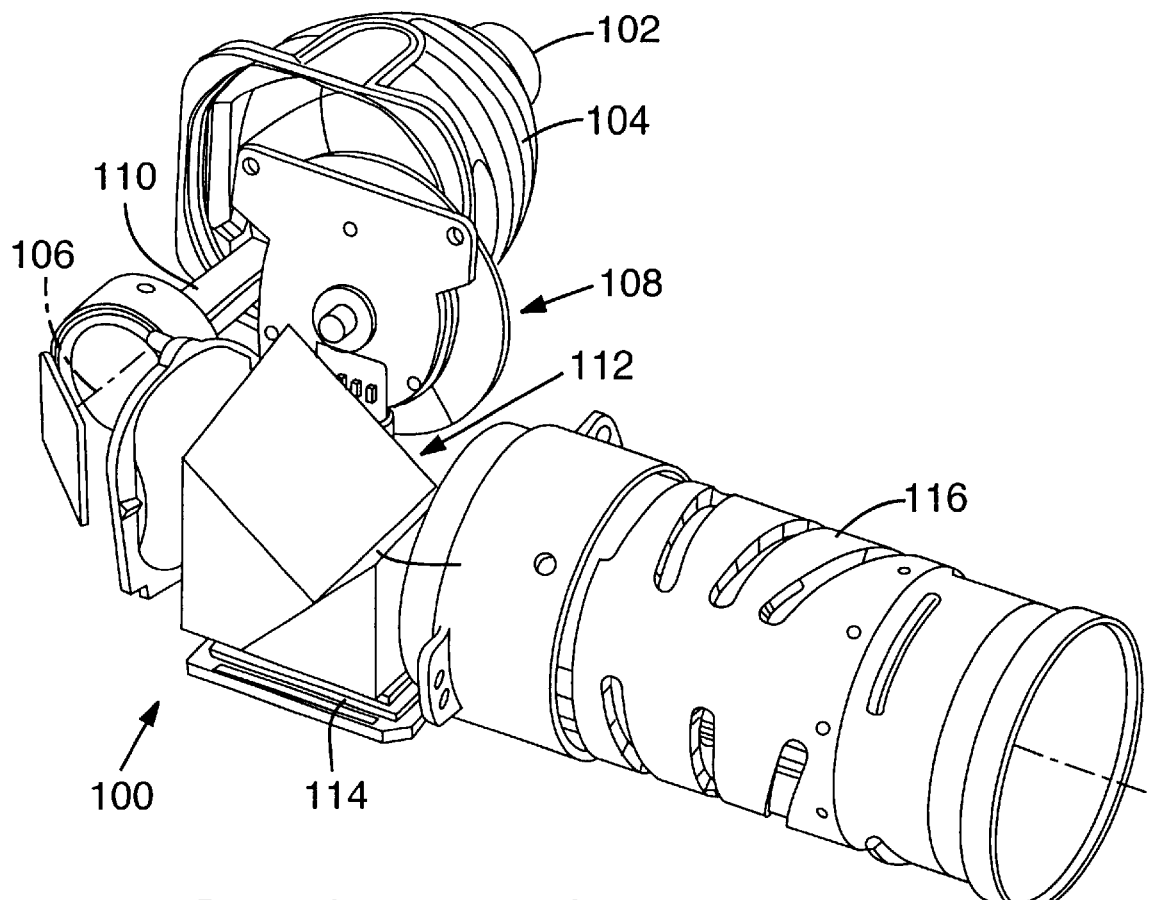
FIG. 1 is an isometric pictorial view of a prior art color image projection system.
Figure 2:
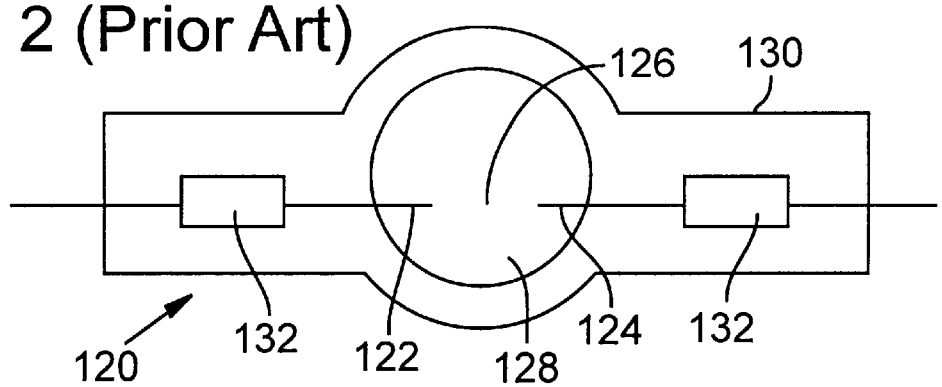
FIG. 2 is an enlarged, diagrammatic side elevation view of a prior art HID arc lamp.

Different embodiments of the present invention, described by way of example, position an auxiliary light source at different locations in image projection system 100 of FIG. 1 to compensate for the emission energy imbalance in the emission spectrum of primary light source 102. Skilled persons will readily appreciate that the present invention can be implemented in other types of image projection systems, such as a three-path projection system.

Figure 3A:
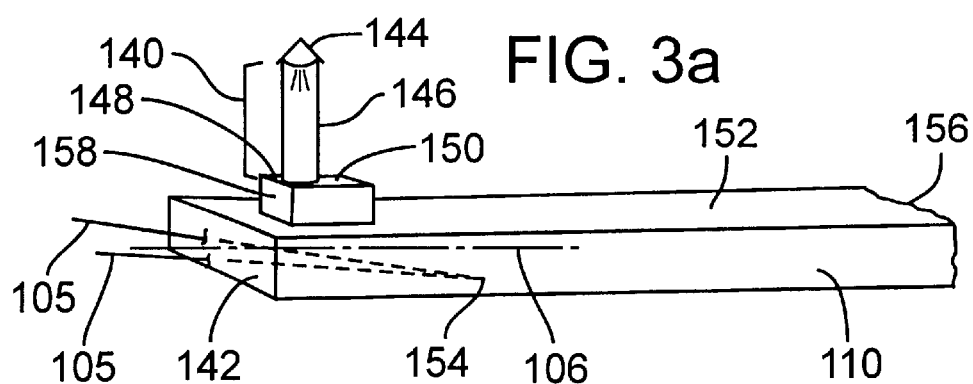
FIG. 3a is a fragmentary oblique view of a first embodiment of an illumination subsystem added to the prior art image projection system of FIG. 1 in which an auxiliary light source is affixed at a location near the entrance end of a solid light tunnel before the location of the first paraxial reflection.

FIG. 3a shows a schematic view of a first embodiment of the present invention, in which an auxiliary light source 140 is affixed at a location near an entrance end 142 of an optical integrating device, preferably light tunnel 110. Auxiliary light source 140 preferably includes a solid state light-emitting device 144, such as a light-emitting diode (LED), from which compensating light propagates through an optical fiber 146 into an optical coupling device, preferably a prism 148. Prism 148 directs the compensating light into light tunnel 110 at an appropriate angle to cause the compensating light to coincide with light rays 105 of polychromatic light propagating along primary light path 106. In the embodiment depicted in FIG. 3a, optical fiber 146 is affixed to prism 148 on an input prism face 150 that is substantially parallel to a first light tunnel surface 152 to which prism 148 is affixed. Prism 148 is affixed at a location near entrance end 142 of light tunnel 110 upstream of a location 154 where the first paraxial reflection occurs. Providing optical contact between prism 148 and first light tunnel surface 152 before location 154 of the first paraxial reflection minimizes loss of the polychromatic light from light path 106 into prism 148.

Light tunnel 110, shown in FIG. 3a, is one exemplary optical integrating device; alternative optical integrating devices are discussed in detail later with reference to certain implementations of this first embodiment. Light tunnels are commonly implemented in image projection systems to create a uniform illumination pattern with the same dimensional proportions as the final desired image. Light tunnels operate on the principle of multiple reflection, wherein transmitted light reflects off all sides of the light tunnel such that light of substantially uniform intensity is emitted from the output end of the light tunnel. Light tunnel 110 is preferably of rectangular shape so that the uniform illumination pattern of light propagating from an exit end 156 of light tunnel 110 of rectangular shape. Light tunnel 110 is also preferably composed of a solid glass rod. Light tunnel 110 is preferably wider than prism 148 so that the total surface area of light tunnel 110 that supports prism 148 is minimized and thus the amount of loss of polychromatic light from primary light path 106 is minimized. An exemplary solid light tunnel is 4.5 mm×6.0 mm×40 mm long.

Light-emitting device 144 can be any light source including an LED, a laser, and an arc lamp. An LED is a preferred solid state light-emitting device because it emits virtually monochromatic light and is compact and inexpensive. LEDs that emit light with an emission spectrum corresponding to red light typically emit approximately 30 lumens of red light. This additional red light generally effects a 10 percent increase in red light emission energy content in primary light path 106. The introduction of red light allows for use of a color wheel with a smaller red segment and larger green and white segments to increase overall light transmission.

Optical fiber 146 can be made of any suitable material, but is preferably plastic or glass. Optical fiber 146 can be any size that is appropriate to the image projection system, but preferably has a diameter of approximately 1 mm because such an optical fiber is inexpensive and more robust than an optical fiber with a smaller diameter. Optical fiber 146 may be of any suitable shape that is appropriate to the image projection system. Optical fiber 146 depicted in FIG. 3a is a straight fiber. Alternatively, optical fiber 146 may be curved, as shown in FIG. 4a.

Optical fiber 146 may be directly coupled to light tunnel 110. Such coupling may be implemented in any suitable, conventional way, but one of the following two arrangements is preferred. In the instance of a hollow light tunnel, an exit end 302 of optical fiber 146 abuts entrance end 142 of light tunnel 110, as is shown in FIG. 4a. In this alternative, optical fiber 146 is preferably attached to a corner of entrance end 142 of light tunnel 110 so that loss of polychromatic light emitted by primary light source 102 and reflected or refracted off optical fiber 146 is minimized. In a second alternative arrangement, exit end 302 of optical fiber 146 abuts a first light tunnel surface 152, as shown in FIG. 4b. Both methods allow compensating light propagating from solid state light-emitting device 144 to exit optical fiber 146 and coincide with polychromatic light emitted by primary light source 102.

The benefits of the illumination subsystem of the present invention can also be achieved without the incorporation of optical fiber 146 into auxiliary light source 140. In an illumination subsystem configured without optical fiber 146, compensating light propagating from solid state light-emitting device 144 directly enters prism 148.

Alternatively, the benefits of the illumination subsystem of the present invention can be achieved by providing multiple optical fibers 146 in a fiber bundle to direct compensating light emitted by the solid state light-emitting device 144 into an optical integrating device. FIG. 5 shows multiple separate fiber bundles, each formed with multiple fibers. The ends of multiple optical fibers 146 may be embedded in an optical integrating device 306 that is made of an optical material with an index of refraction that corresponds to the index of refraction of the material used to form light tunnel 110. Optical fibers 146 are embedded at an angle with respect to light path 106 such that the compensating light they emit coincides with polychromatic light from primary light source 102 within light tunnel 110. Optical assembly 308, including optical fibers 146 and optical integrating device 306, may be affixed to any side of light tunnel 110 (alternative attachments shown in phantom lines). One advantage to use of this alternative implementation is that optical assembly 208, optical fibers 146, and optical integrating device 306, can be separately constructed and installed with an optical adhesive, resulting in reduced manufacturing costs. Alternatively, multiple optical assemblies 308 may be attached to light tunnel 110.

Figure 3B:
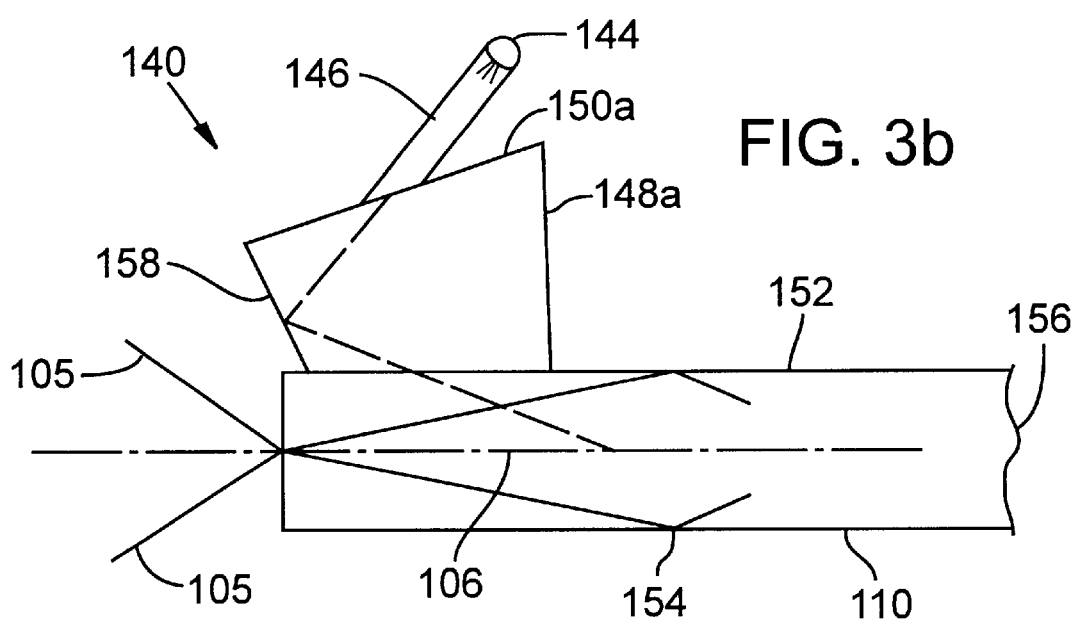
FIG. 3b is an enlarged fragmentary side elevation view of the first embodiment of the illumination subsystem of FIG. 3a implemented with an alternative prism.

Compensating light emitted by solid state light-emitting device 144 and transmitted through optical fiber 146 can be coupled into light tunnel 110 by an optical coupling device. Exemplary optical coupling devices include prisms, glass rods, and mirrors; however the preferred optical coupling device is prism 148. Prism 148 is preferably attached to optical fiber 146 using an optically transparent adhesive, e.g., a UV-cured adhesive. The attachment of prism 148 to optical fiber 146 is such that the compensating light directed through optical fiber 146 reflects off prism reflection surface 158 with an angle of incidence that allows the compensating light to coincide with the light rays 105 of polychromatic light that propagate along primary light path 106. For example, FIG. 3b shows one exemplary illumination subsystem in which compensating light exiting optical fiber 146 has an approximately 45 degree angle of incidence with respect to a prism reflection surface 158 of a prism 148a to allow the compensating light to coincide with light path 106 before the location of first paraxial reflection 154. As shown in FIG. 3b, prism 148a has an input prism face 150a that is angularly inclined relative to light tunnel surface 152 to illustrate an alternative propagation path of light emitted by solid state light-emitting device 144. Prism 148 need not have an inclined prism face, this implementation is merely exemplary.

Prism 148 may be of any size or shape suitable for the image projection system. For example, input prism face 150 depicted in FIG. 3a is substantially parallel to first light tunnel surface 152 on which prism 148 is mounted, whereas the input prism face 150a depicted in FIG. 3b is not parallel to first light tunnel surface 152.

The benefits of the illumination subsystem of the present invention can be achieved without the incorporation of an optical coupling device into auxiliary light source 140. In an illumination subsystem configured without an optical coupling device, compensating light is injected directly into light tunnel 110 via optical fiber 146 or solid state light-emitting device 144.

Figure 6:
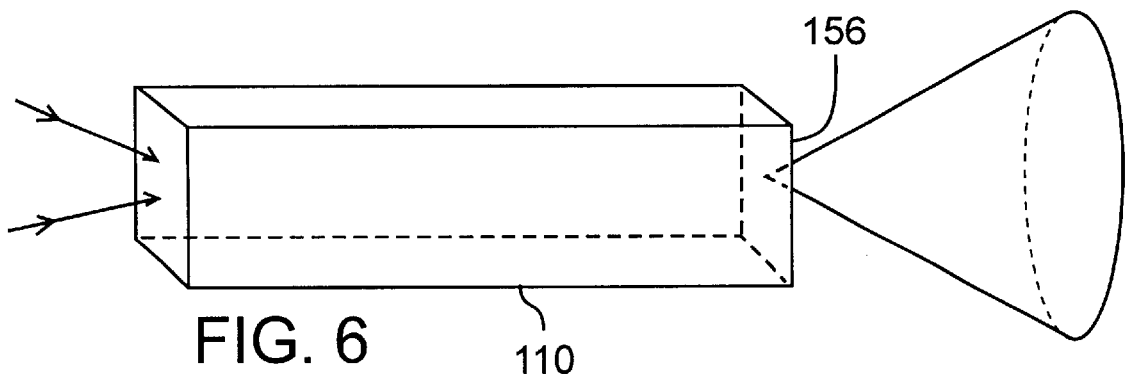
FIGS. 6 and 7 show for all azimuthal angles on-axis a cone representing the distribution of the intensity of light exiting the light tunnel of, respectively, the prior art image projection system of FIG. 1 and of the image projection system of either of FIG. 3a or FIG. 3b.
Figure 7:
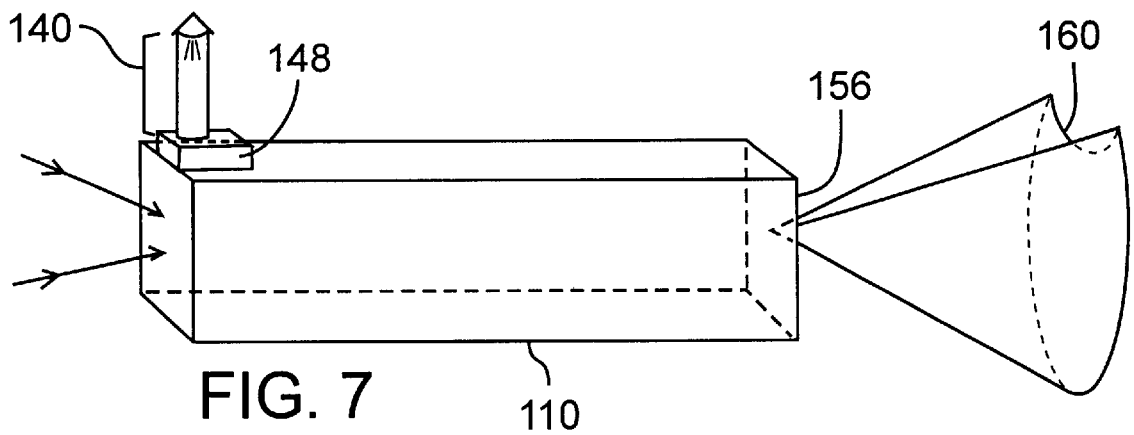

Providing optical contact between prism 148 and first light tunnel surface 152 before location 154 of the first reflection minimizes loss of the polychromatic light entering light tunnel 110 through entrance end 142 because little polychromatic light is incident on the side surfaces of light tunnel 110 close to entrance end 142. This minimal light loss is demonstrated by a comparative relationship of light intensity distributions depicted in FIGS. 6 and 7. FIG. 6 is a schematic diagram showing a cone of light exiting light tunnel 110 of the prior art image projection system 100 of FIG. 1. The cone of light approximates for all azimuthal angles on-axis the angular light intensity distribution of polychromatic light emitted by primary light source 102 following transmission through light tunnel 110 and upon exit from light tunnel 110 at exit end 156. In comparison, FIG. 7 is a schematic diagram showing a cone of light exiting light tunnel 110 of the image projection system of either of FIG. 3a or FIG. 3b, in which auxiliary light source 140 introduces compensating light into the image projection system. The cone of light depicted in FIG. 7 approximates the angular light intensity distribution of polychromatic light emitted by primary light source 102 following transmission through light tunnel 110 and upon exit from light tunnel 110 at exit end 156. A notch 160 at the top of the cone of light shown in FIG. 7 represents an approximately 3 percent loss of polychromatic light due to the affixing of optical coupling prism 148. Such light loss is minimal in light of the total gain in emission energy content corresponding to red light resulting from the incorporation of auxiliary light source 140 into the image projection system of the present invention.

Auxiliary light source 140 of the first embodiment of the present invention may be affixed to the optical integrating device at any location near entrance end 142. Affixing auxiliary light source 140 at a location near entrance end 142 of the optical integrating device causes minimal light loss because a minimal amount of light is incident on the integrating device near its entrance end. While affixation of auxiliary light source 140 is preferably effected at any location near entrance end 142, affixation at certain locations offers various benefits, which are discussed below.

Figure 8:
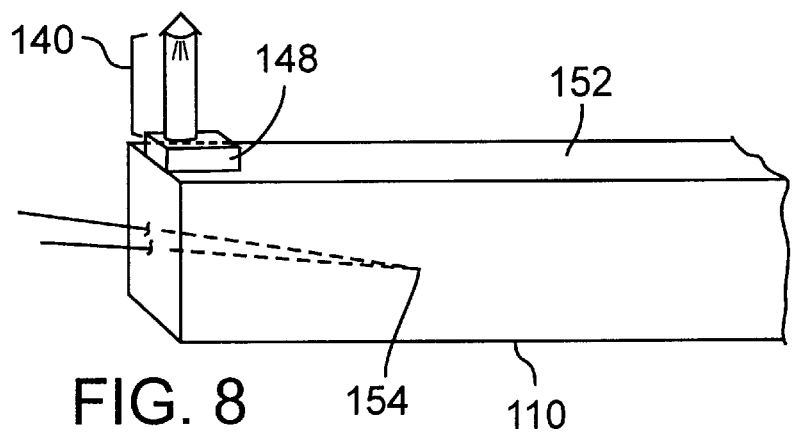
FIG. 8 is a fragmentary oblique view of a first alternative implementation of the first illumination subsystem embodiment in which the auxiliary light source is offset to a corner of a solid light tunnel.

FIG. 8 depicts a first alternative implementation of the first embodiment of the present invention in which auxiliary light source 140 is affixed to first light tunnel surface 152 and is offset to a corner of light tunnel 110. This first alternative implementation is especially beneficial because it reduces the loss of polychromatic light propagating through the point of affixation of auxiliary light source 140.

Figure 9:
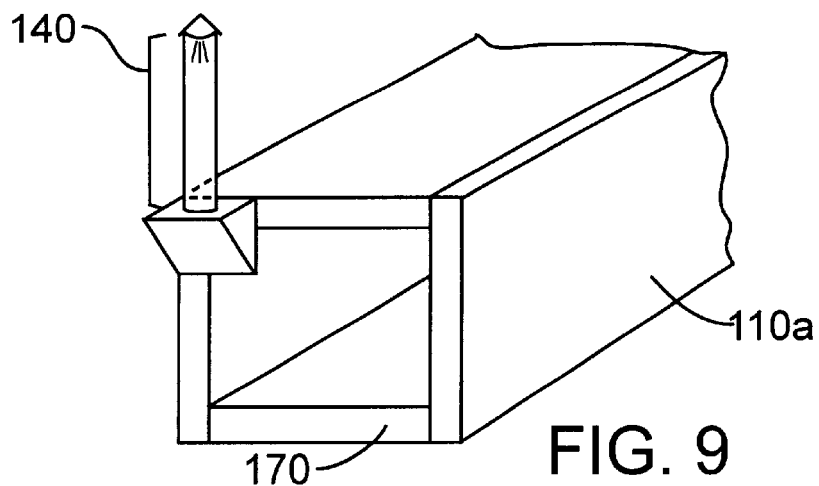
FIG. 9 is a fragmentary oblique view of a second alternative implementation of the first illumination subsystem embodiment in which the auxiliary light source is affixed to an entrance end of a hollow light tunnel.

FIG. 9 depicts a second alternative implementation of the first embodiment of the present invention in which auxiliary light source 140 is affixed to a surface of an entrance end 170 of a hollow light tunnel 110a. While this alternative implementation may introduce additional thickness to entrance end 170 of light tunnel 110a and thereby impact the spacing of color wheel assembly 108, this implementation allows for the use of a hollow light tunnel instead of a solid light tunnel of the type shown in FIGS. 3a, 3b, and 8. Hollow light tunnels are less expensive and shorter in length as compared to a solid light tunnel that achieves an equivalent illumination uniformity at the tunnel output end.

Figure 10A:
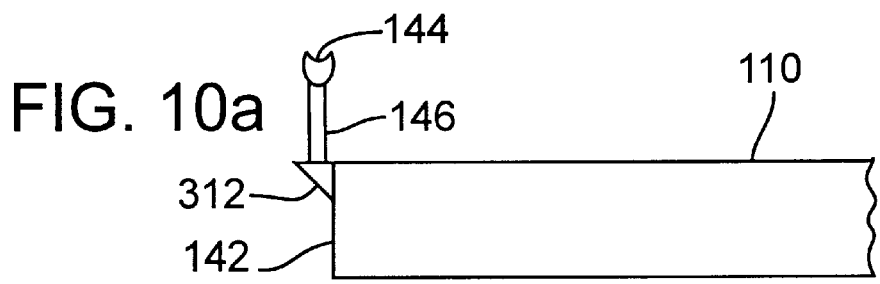
FIGS. 10a, 10b, and 10c are fragmentary side elevation views of the illumination subsystem of FIG. 9 implemented with alternative optical integrating devices.
Figure 10B:
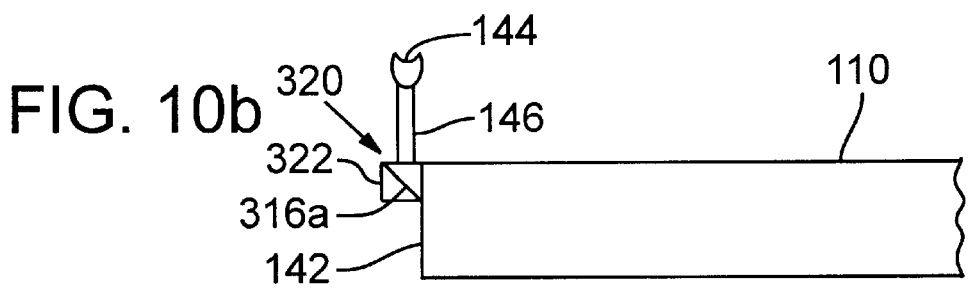
Figure 10C:
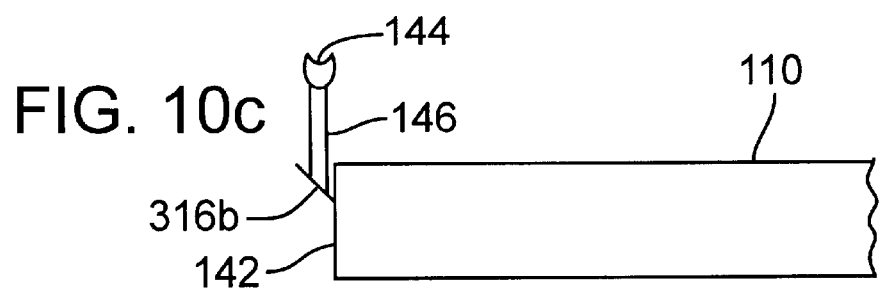

FIGS. 10a, 10b, and 10c depict three alternative optical integrating devices that can be used in the image projection system shown in FIG. 9. FIG. 10a shows use of an injection prism 312 that has a reflectance surface at a 45 degree angle relative to entrance end 142 of light tunnel 110. Injection prism 312 can be used with a hollow light tunnel of the type shown in FIG. 9 or with a solid light tunnel of the type shown in FIG. 8. FIG. 10b shows use of a beam splitter prism 320 in the image projection system of FIG. 9. Beam splitter prism 320 includes a dichroic mirror 316a with a compensating prism 322 situated at a 45 degree angle to entrance end 142 of light tunnel 110, thereby forming a beam splitter cube that allows light from primary light source 102 to pass through the beam splitter cube without getting lost. FIG. 10c shows use of a dichroic mirror 316b inclined at an acute angle to entrance end 142 of light tunnel 110 of the image projection system of FIG. 9.

The image projection system of the present invention may also include multiple auxiliary light sources. The use of multiple auxiliary light sources allows the user to implement lower output, and therefore less expensive, solid state light-emitting devices while effecting a reduction in emission energy imbalance similar to that effected by using a single high output solid state light source. Alternatively, the use of multiple auxiliary light sources allows the user to effect an increased reduction in emission energy imbalance by introduction of an increased amount of compensating light whose emission energy content reduces an emission energy imbalance. The multiple auxiliary light sources may be affixed to any side of light tunnel 110 or 110a but are preferably affixed at a location near entrance end 142 or 170, before the location of first paraxial reflection 154.

Figure 11A:
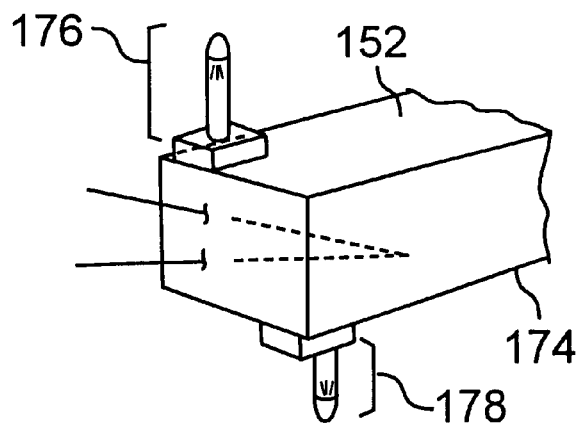
FIGS. 11a and 11b are fragmentary oblique views depicting two configurations of a third alternative implementation of the first illumination subsystem embodiment in which multiple auxiliary light sources are affixed to, respectively, corresponding or opposite corners of opposed surfaces of the solid light tunnel.
Figure 11B:
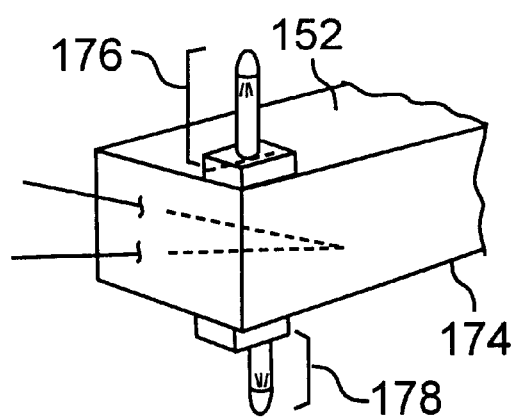

FIGS. 11a and 11b depict two preferred implementations of a third alternative implementation of the first embodiment of the present invention in which one of multiple auxiliary light sources is affixed to first light tunnel surface 152 and one of multiple auxiliary light sources is affixed to a second light tunnel surface 174 that is opposite first light tunnel surface 152. FIG. 11a shows a configuration in which a first auxiliary light source 176 is affixed to first light tunnel surface 152 and a second auxiliary light source 178 is affixed to second light tunnel surface 174 such that first and second auxiliary light sources 176 and 178, respectively, are located on opposite corners of light tunnel 110. FIG. 11b shows an alternative configuration in which first and second auxiliary light sources 176 and 178, respectively, are located on corresponding corners of light tunnel 110.

Figure 12:
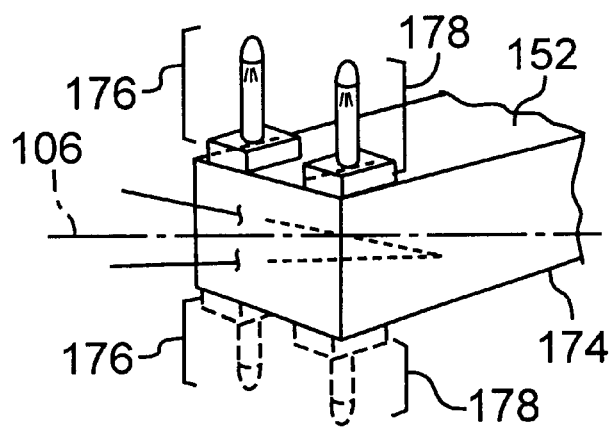
FIG. 12 is a fragmentary oblique view of a fourth alternative implementation of the first illumination subsystem embodiment in which multiple light sources are affixed to the same surface of the solid light tunnel.

FIG. 12 depicts a fourth alternative implementation of the first embodiment of the present invention in which the multiple auxiliary light sources 176 and 178 are affixed to either of first light tunnel surface 152 (solid lines) or second light tunnel surface 174 (phantom lines).

Skilled persons will appreciate, therefore, that a prism may be placed on the entrance surface, any side surface, or top or bottom surfaces of a solid or hollow light tunnel.

Figure 13A:
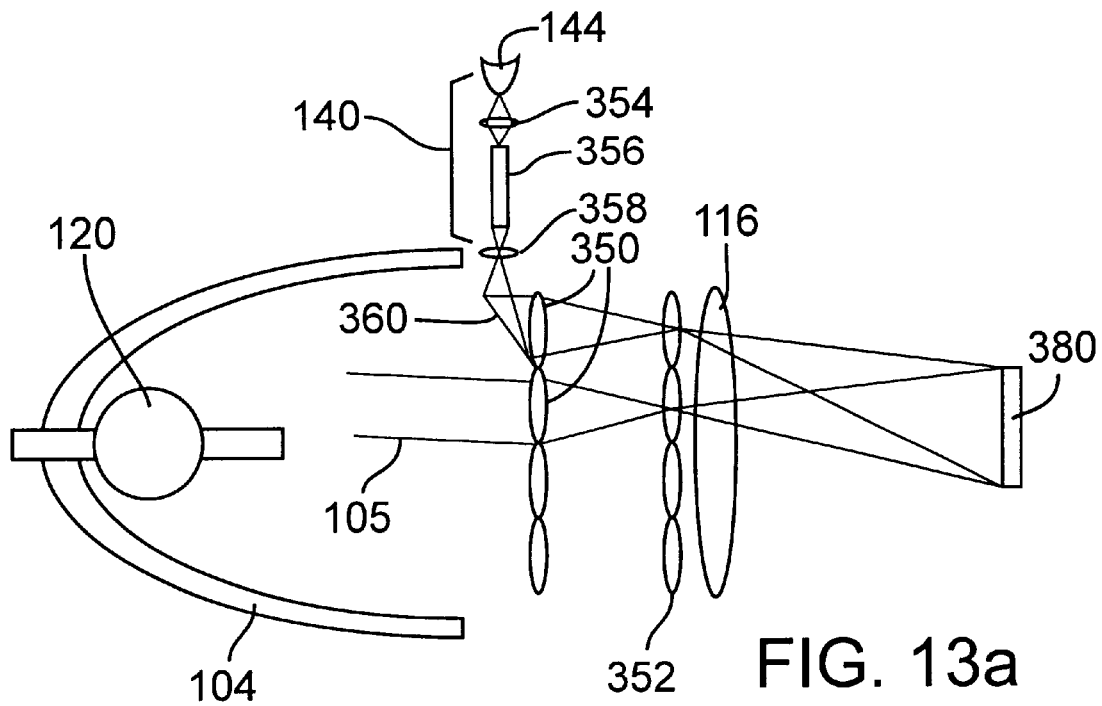
FIG. 13a is an enlarged, diagrammatic side elevation view of a fifth alternative implementation of the first illumination subsystem embodiment in which a pair of flyseye lenslets are implemented as the optical integrating device.
Figure 13B:
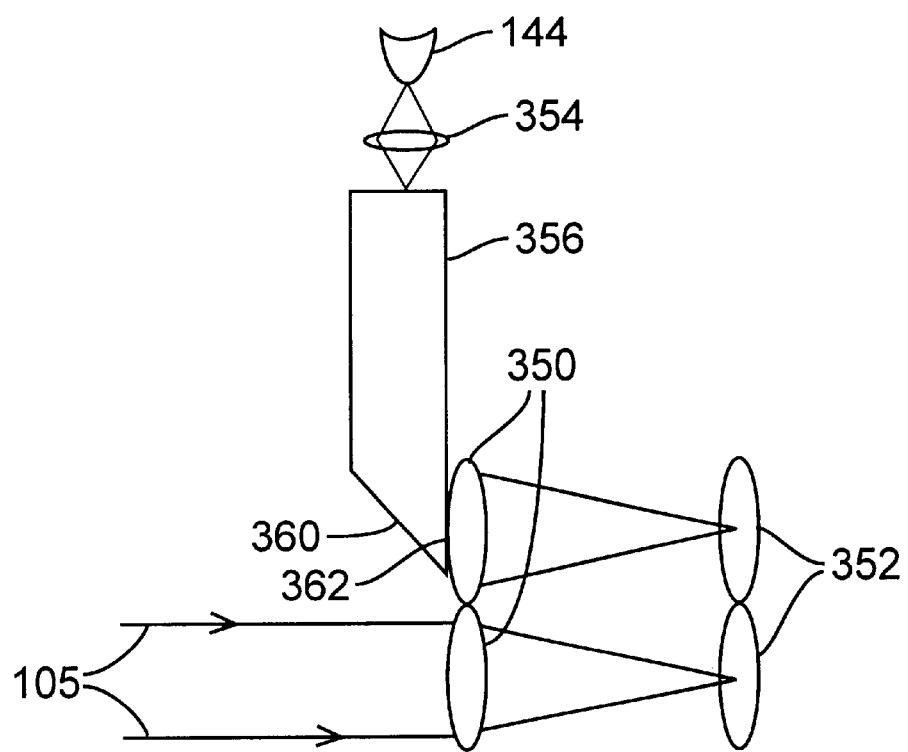

FIGS. 13a and 13b show a fifth alternative implementation of the present invention in which a second exemplary optical integrating device is implemented. This optical integrating device is a pair of flyseye integrator plates each containing an array of lenslets designed to create multiple overlapping images so that any nonuniformity in one lenslet is integrated out at a display device (DMD) 380. FIG. 13a shows an embodiment of the present invention in which light emitted by an HID arc lamp 120 strikes (or is incident on) a first set of flyseye lenslets 350. Each first lenslet 350 has the same aspect ratio as display device 380. Light exits first flyseye lenslets 350 and enters a second set of flyseye lenslets 352, each of which is spatially aligned with corresponding first flyseye lenslets 350. Second flyseye lenslets 352 image the apertures of first flyseye lenslets 350 onto display device 380. A condensing lens 116 overlaps the multiple images at lenslets 350 created by corresponding lenslets 352 onto display device 380. First and second flyseye lenslets, 350 and 352 respectively, may be any size and shape appropriate to the image projection system, but are preferably 4×6 mm rectangular.

As shown in FIG. 13a, auxiliary light source 140 is affixed at a location near first flyseye lenslet 350. Compensating light emitted by solid state light-emitting device 144 preferably passes through a light collection lens 354, an integrator tunnel 356, and an integrator imaging lens 358 before encountering mirror 360. Mirror 360 may be of metallic or multilayer dielectric type. If mirror 360 is a multilayer dielectric type, it can be designed to reflect the compensating light while still transmitting much of the polychromatic light from the primary light source. Compensating light exiting integrator imaging lens 358 reflects off mirror 360 through one of first flyseye lenslets 350 and through one of second flyseye lenslets 352, which reflection causes rays of compensating light to coincide with light rays 105 of polychromatic light. This alternative implementation results in first flyseye lenslet 350 being uniformly filled with compensating light such that the resulting image projected by the projection device contains excellent color uniformity.

Implementation of the flyseye integrator plates may also involve an auxiliary light source without an integrator tunnel 356. Thus compensating light emitted by solid state light-emitting device 144 passes through light collection lens 354 and integrator imaging lens 358 before being reflected by mirror 360 through the flyseye optical integrating device. One of first flyseye lenslets 350 is filled with compensating light exiting the auxiliary light source; thus no polychromatic light exiting primary light source 102 enters first flyseye lenslet 350. One advantage of this alternative implementation is that the auxiliary light device can be easily coupled to the remainder of the image projection system. However, this alternative implementation may result in poor color uniformity in the final image as a consequence of non-uniform filling of first flyseye lenslet 350.

As shown in FIG. 13b, the auxiliary light source may lack an integrator imaging lens 358. In such a image projection system, compensating light emitted by solid state light-emitting device 144 passes through light collection lens 354 and integrator tunnel 356 before being reflected off mirror 360, located near exit end 362 of integrator tunnel 356. The compensating light reflects off a 45-degree angled exit end 362 of integrator tunnel 356 by total internal reflection or a mirror coating and is directed through first flyseye lenslet 350.

In a second preferred embodiment, the auxiliary light source is coupled to a light reflector adjacent to the primary light source and thereby allows the compensating light to propagate through the image projection system with the same efficiency as that of the light generated by the primary light source.

Figure 14:
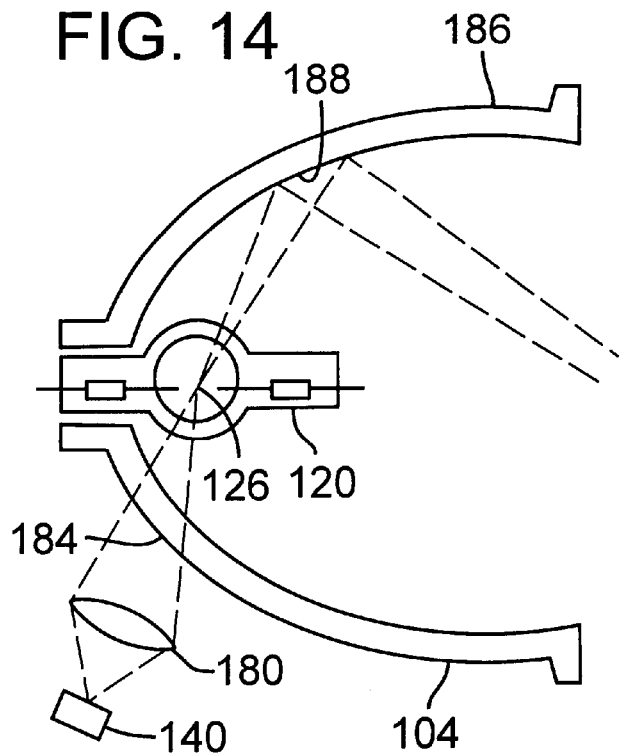
FIG. 14 is a diagram of a second embodiment of an illumination subsystem in which an auxiliary light source is positioned adjacent to a light reflector and emits compensating light that is coupled with a primary light source.

FIG. 14 shows a schematic diagram of a second embodiment of the present invention in which auxiliary light source 140 is positioned adjacent to an outer surface 186 of light reflector 104 and is coupled to primary light source 102, which is preferably an HID arc lamp 120. Auxiliary light source 140 emits a compensating light beam that is focused by an optical focusing element 180, and propagates through a compensating light entrance zone 184 on light reflector 104 to pass through arc gap 126 of arc lamp 120 and strike an inner surface 188 of light reflector 104.

To enable propagation of the compensating light beam through light reflector 104, inner surface 188 of light reflector 104 at compensating light entrance zone 184 carries no coating, a low reflection coating, or preferably a wavelength selective transmission coating, the last of which transmits light of wavelengths equal to the compensating light wavelength while reflecting visible light of wavelengths not equal to the compensating light wavelength. This compensating light entrance zone coating is generally a different coating material from that applied to the remainder of inner surface 188 of light reflector 104. Inner surface 188 typically carries a metallic or dielectric coating to achieve maximum reflectance over the operating range of wavelengths of image projection system 100. Light reflector 104 is preferably coated with a spectrally selective transmission coating, which transmits compensating light through the image projection system with the same efficiency as polychromatic light generated by HID arc lamp 120 and reflects light transmitted by other light sources. Polychromatic light emitted by HID arc lamp 120 may be lost through compensating light entrance zone 184 of light reflector 104. The wavelength selective transmission coating minimizes the loss of polychromatic light emitted by HID arc lamp 120 which light would otherwise pass through an uncoated compensating light entrance zone 184.

Light reflector 104 is preferably made of a material such as glass that transmits light so that the compensating light beam can pass through the light reflector wall on its way to arc gap 126. Depending on the design goals and the details of downstream optical parts for the image projection system, light reflector 104 may have an ellipsoidal, a paraboloidal, a general aspheric, or a faceted form. Because it provides illumination beam collection and focusing, light reflector 104 preferably includes a cold mirror. Since outer surface 186 of light reflector 104 is effectively an additional lens surface that refracts the incoming compensating light, outer surface 186 preferably is smooth and well controlled. Other specifications such as size, length, focal length, and thermal characteristics are determined by the design goals of the image projection system.

As stated above with respect to the first embodiment of the present invention, the solid state light emitting device contained within auxiliary light source 140 can be any solid state light source including an LED, a laser, or an arc lamp. LEDs are preferred because they emit virtually monochromatic light and are compact and inexpensive. LEDs that emit light with an emission spectrum corresponding to red light typically emit approximately 30 lumens of red light. This additional amount of red light generally effects a 10 percent increase in red light emission energy content in the primary light path.

Compensating light can alternatively be delivered using fiber optics to transfer the compensating light from auxiliary light source 140 to optical focusing element 180, which collects and focuses the compensating light propagating through compensating light entrance zone 184 of light reflector 104 and into arc gap 126.

Figure 15:
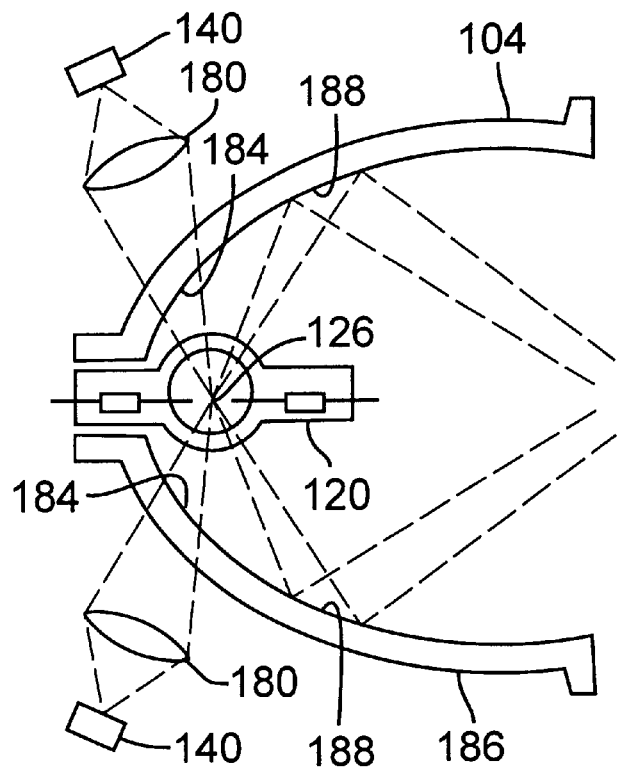
FIG. 15 is a diagram of an alternative implementation of the second embodiment of the illumination subsystem of FIG. 14 in which multiple auxiliary light sources are used.

FIG. 15 depicts an alternative implementation of the second embodiment of the illumination subsystem of the present invention in which multiple auxiliary light sources 140 (two shown) are placed around the perimeter of light reflector 104 to more uniformly distribute compensating light within the illumination beam striking color wheel assembly 108 (not shown) and thus increase the uniformity with which the compensating light is distributed in the final projected image. Each auxiliary light source 140 is focused through arc gap 126 and is aligned so that each compensating light beam, having propagated through arc gap 126, does not impinge upon any other compensating light beam entering through compensating light entrance zone 184. The quantity, beam size, location, and orientation of the auxiliary light sources 140 are determined by the specific performance goals of the image projection system.

Thus, the auxiliary light source emitting compensating light having an emission energy content that minimizes an emission energy imbalance may be affixed to the image projection system of the present invention in any of the above-mentioned locations in order to effect improved image brightness and color balance. The addition of the auxiliary light source also allows the user to control the color temperature of the projected image without perceptibly decreasing image brightness or bit depth.

As shown in FIG. 1, prior art image projection systems have a primary light source 102 operating with a constant flow of electric current that creates an image with a color temperature of 8000–10,000 Kelvin. Because the desired color temperature of a projected image is approximately 6500 Kelvin, color temperature adjustment may be necessary. In the prior art image project systems, color temperature adjustment entailed discarding spectrally selective light, typically light in the green and blue wavelength ranges, by implementing software that decreases the transmissivity of light corresponding to these colors. However, discarding light to achieve the desired color temperature causes a decrease in light exiting the image projection system, resulting in a consequent decrease in image brightness. Further, the spectrally selective disposition of light creates undesirable shading artifacts in the projected images.

For example, an exemplary LP 335 image projection system manufactured by InFocus Corporation, of Wilsonville, Oreg., the assignee of this application, contains a 45 degree white segment and has a color temperature of 7100 Kelvin. To adjust the color temperature to the desired 6500 Kelvin, the green and blue light transmissions are reduced by 40% each. This reduction results in a 27% decrease in image brightness and a green and blue bit depth loss of 40% each, creating shading artifacts in the projected image.

In contrast, the image projection system of the present invention allows the user to achieve the desired color temperature without decreasing image brightness or creating shading artifacts. Specifically, the image projection system of the present invention allows the user to control the electrical energy flowing through the auxiliary light source and thereby effect color adjustment without discarding spectrally selective light.

Figure 16:
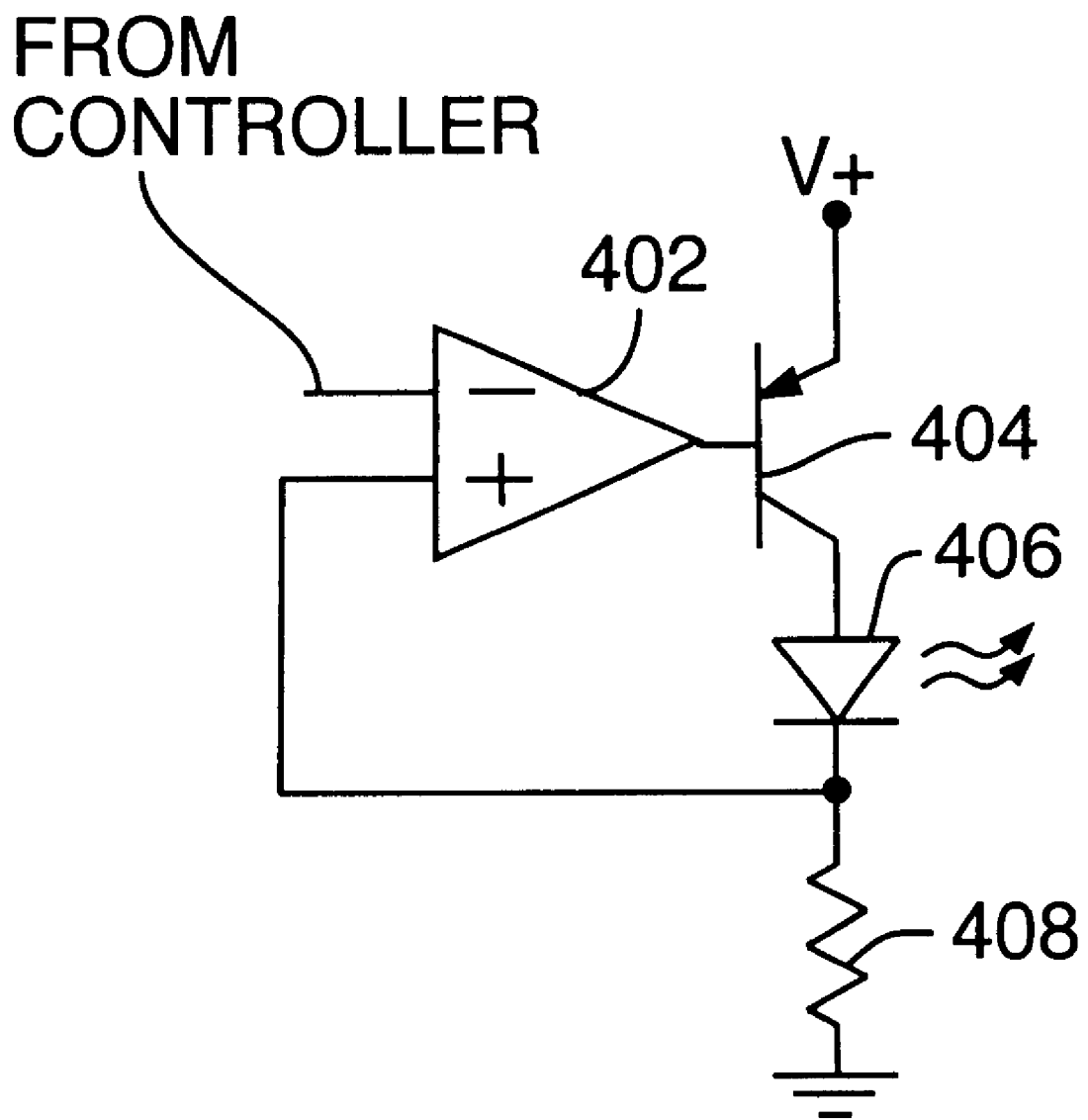
FIG. 16 is a simplified circuit diagram of an electric current control device that sets the amount of light emitted by an auxiliary light source of the present invention.

FIG. 16 is a simplified circuit diagram of an electric current control device that sets the amount of current flowing through light-emitting diode 144 and thereby sets the amount of red light it emits. With reference to FIG. 16, a controller (not shown) that synchronizes the operation of color wheel assembly 108 and positions of light reflecting surface 114 applies at particular times a voltage to an inverting input of an operational amplifier 402. The output of amplifier 402 is connected to the base terminal of a PNP transistor 404 to control the amount of current flowing through it in response to the voltage applied by the controller. The emitter and collector terminals of transistor 404 are connected to, respectively, a bias voltage supply and the anode of light-emitting diode 144 to cause current flow through it. The cathode of light-emitting diode 144 is connected to a sampling resistor 406, which is connected to ground. The value of sampling resistor 406 develops a voltage that is applied to the noninverting input of amplifier 402.

Whenever there is a zero steady-state potential difference across the inverting and noninverting inputs of amplifier 402, the current flowing through light-emitting diode 144 remains fixed at a value corresponding to the voltage level set by the controller. Thus, operational amplifier 402 and transistor 404 function as a voltage-to-current converter that sets the amount of current flowing through light-emitting diode 144. In operation, the controller applies a specified voltage to the inverting input of amplifier 402 during the time when the R filter segment of rotating color wheel assembly 108 intercepts polychromatic light rays 105 propagating from primary light source 102 to enhance the amount of red light transmission.

Thus the amount of compensating light emitted by auxiliary light source 140 can be adjusted to achieve the desired color temperature. Referring to the above-mentioned exemplary LP 335 image projection system, a user of the present invention can achieve the desired color temperature of 6500 Kelvin by increasing the amount of electrical energy flowing through auxiliary light source 140 so that it emits 45% of the total red light. Because compensating light is added to the image projection system, as compared to being discarded, as occurs in prior art image projection systems, the image brightness increases by 4% and image artifacts are not introduced.

It will be obvious to those having skill in the art that many changes may be made to the details of the above-described embodiments of this invention without departing from the underlying principles thereof. The scope of the present invention should, therefore, be determined only by the following claims.

What is claimed is:

1. An image projection system comprising:
a primary light source to propagate a polychromatic light along a primary light path, the polychromatic light having an emission spectrum composed of a mixture of primary colors having imbalanced emission energy contents;
an auxiliary light source to propagate a compensating light to coincide with the polychromatic light at a location on the primary light path, the compensating light having a compensating emission energy content for a spectral range to offset the emission energy imbalance of the primary light source;
an optical integrating device, disposed along the primary light path and optically coupled to the primary and auxiliary light sources, to receive the polychromatic and compensating lights separately prior to coincidence or combined after coincidence, to integrate the combined light and to allow the integrated combined light to exit with more balanced emission energy contents;
an imaging arrangement optically coupled to the optical integrating device to project an image using the exiting light with more balanced emission energy contents; and
a circuit coupled to the auxiliary light source to adjustably apply an amount of electrical energy to the auxiliary light source to adjust an intensity of the compensation emission energy of the compensating light to control a color temperature of the image projected.

2. The system of claim 1, in which the primary light source comprises an arc lamp.

3. The system of claim 2, in which:
the emission energy imbalance in the emission spectrum results from a deficiency in emission energy content corresponding to red light emitted by the arc lamp; and
the compensating emission energy content is within a spectral range encompassing red light of an intensity that causes a reduction in the emission energy imbalance.

4. The system of claim 1, in which the auxiliary light source contains a light emitting device selected from a group including a light emitting diode, a laser, and an arc lamp.

5. The system of claim 1, in which:
the optical integrating device comprises a light tunnel within which light propagating through the light tunnel undergoes multiple occurrences of reflection so that light exiting the light tunnel is of substantially uniform light intensity over a display area with a similar aspect ratio as the projected image projected;
the light tunnel has an entrance end and first and second side surfaces and a first reflection occurs at a location nearer to the entrance end; and
the light tunnel receives the primary and compensating lights separately with the compensating light coinciding with the primary light path at a location upstream of or substantially at the location where the first reflection of light occurs.

6. The system of claim 5, in which the auxiliary light source includes an optical fiber through which the compensating light propagates, the optical fiber being optically coupled to one of the first side surface, the second side surface, and the entrance end of the light tunnel at the location upstream of or substantially at the location of the first reflection of light.

7. The system of claim 6, in which the optical fiber has an exit end, and further comprising a reflective surface positioned between the exit end of the optical fiber and the light tunnel, the reflective surface optically coupling the compensating light propagating through the optical fiber to the light tunnel in a direction and at an angle to coincide with the primary light path at the location of the light tunnel upstream of or substantially at the location of the first reflection of light.

8. The system of claim 6, in which the optical fiber has an exit end, and further comprising one of a molded optical material or element positioned between the exit end of the optical fiber and the light tunnel, the one of a molded optical material or element optically coupling the compensating light propagating through the optical fiber to the light tunnel in a direction and at an angle to coincide with the primary light path at the location of the light tunnel upstream of or substantially at the location of the first reflection of light.

9. The system of claim 1, in which the primary light source includes a reflector having inner and outer surfaces, and in which the auxiliary light source is positioned adjacent to the outer surface so the compensating light coincides with the primary light path prior to entry of the primary light path into the optical integrating device, thereby directing the compensating light through the image projection system with the same efficiency as that of the polychromatic light generated by the primary light source.

10. The system of claim 9, in which at least a portion of the inner surface of the reflector is covered by a color selective transmission coating that transmits the emission energy content of the compensating light and reflects the emission energy content of light that differs from the emission energy content of the compensating light.

11. The system of claim 1, in which the optical integrating device comprises a first and a second flyseye integrator plate each containing an array of lenslets, and wherein compensating light fills one or more lenslets of the first flyseye integrator plate, such that the compensating light is directed in a direction and at an angle to coincide with the primary light path.

12. The system of claim 11, in which the compensating light passes through an integrator tunnel before being directed to coincide with the primary light path.

13. The system of claim 1, in which the auxiliary light source comprises a light emitting diode, and the circuit is designed to adjust an amount of electric current flowing through the light emitting diode to control the amount of emitted light at an instance in time.

14. The system of claim 13, in which the compensating light emitted by the light emitting diode is within a spectral range encompassing red light.

15. The system of claim 1, in which color temperature of the projected image is between about 6000 Kelvin and about 7500 Kelvin.

16. The system of claim 1, in which the circuit comprises a transistor-driven voltage source to control the amount of electrical energy applied to the auxiliary light source.

17. In an image projection system, a method of operation comprising:
propagating from a primary light source and along a primary light path, polychromatic light having an emission spectrum composed of a mixture of primary colors with imbalanced emission energy contents;
propagating from an auxiliary light source, a compensating light having a compensating emission energy content for a spectral range to offset the emission energy imbalance of the primary light source,
directing the compensating light to coincide with the polychromatic light to combine the lights;
integrating the combined lights;
projecting an image using the integrated combined light; and
adjusting an amount of electrical energy applied to the auxiliary light source to adjust an intensity of the compensation emission energy of the compensating light to control a color temperature of the image projected.

18. The method of claim 17, in which said integrating being performed using an optical integrating devices, and said directing comprises directing the compensating and polychromatic lights to coincide and be combined at a location within the optical integrating device that is upstream of or substantially at a location where first reflection of light occurs within the optical integrating device.

19. The method of claim 18, in which said directing comprises directing the compensating light to coincide with the polychromatic light through one or more flyeye plates.

20. The method of claim 17, in which the color temperature of the projected image is between about 6000 Kelvin and about 7500 Kelvin.

* * * * *

UNITED STATES PATENT AND TRADEMARK OFFICE
CERTIFICATE OF CORRECTION

PATENT NO. : 6,698,892 B2 Page 1 of 1
APPLICATION NO. : 09/978133
DATED : March 2, 2004
INVENTOR(S) : Peterson, Mark et al.

It is certified that error appears in the above-identified patent and that said Letters Patent is hereby corrected as shown below:

Col. 9, line 37, "...a image"..." should read --...an image...--;

In the Claims:

Col. 14, line 32, "...source,..." should read --...source;...--;

Col. 14, line 44, "...an...devices,..." should read --...an...device,...--;

Col. 14, line 53, "...flyeye..." should read --...flyseye...--.

Signed and Sealed this

Twenty-ninth Day of August, 2006

JON W. DUDAS
*Director of the United States Patent and Trademark Office*